(12) United States Patent
Xu

(10) Patent No.: US 10,298,067 B2
(45) Date of Patent: May 21, 2019

(54) WIRELESS ENERGY TRANSMISSION METHODS AND WIRELESS ENERGY SENDING DEVICES

(71) Applicant: Beijing Zhigu Rui Tuo Tech Co., Ltd, Beijing (CN)

(72) Inventor: Ran Xu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 214 days.

(21) Appl. No.: 15/306,077

(22) PCT Filed: Mar. 12, 2015

(86) PCT No.: PCT/CN2015/074071
§ 371 (c)(1),
(2) Date: Oct. 21, 2016

(87) PCT Pub. No.: WO2015/161724
PCT Pub. Date: Oct. 29, 2015

(65) Prior Publication Data
US 2017/0047789 A1 Feb. 16, 2017

(30) Foreign Application Priority Data

Apr. 23, 2014 (CN) .......................... 2014 1 0165729

(51) Int. Cl.
*H02J 7/02* (2016.01)
*H02J 50/12* (2016.01)
(Continued)

(52) U.S. Cl.
CPC .............. *H02J 50/12* (2016.02); *H02J 7/025* (2013.01); *H02J 50/20* (2016.02); *H02J 50/40* (2016.02); *H02J 50/80* (2016.02)

(58) Field of Classification Search
CPC .. H02J 50/12; H02J 50/20; H02J 50/40; H02J 7/025
See application file for complete search history.

(56) References Cited

U.S. PATENT DOCUMENTS

| 8,159,364 B2 | 4/2012 | Zeine |
| 8,410,953 B2 | 4/2013 | Zeine |

(Continued)

FOREIGN PATENT DOCUMENTS

| CN | 103155353 A | 6/2013 |
| CN | 103812231 A | 5/2014 |

(Continued)

OTHER PUBLICATIONS

International Search Report for PCT Application No. PCT/CN2015/074071, dated Jun. 18, 2015, 3 pages.

*Primary Examiner* — Jeffrey M Shin
(74) *Attorney, Agent, or Firm* — Amin, Turocy & Watson, LLP

(57) ABSTRACT

Wireless energy transmission methods and wireless energy sending devices are provided. The method comprises: controlling, on the basis of a distribution plan of distributing separately multiple emitter nodes of a wireless energy sending device to multiple wireless energy receiving devices, the multiple emitter nodes to transmit wireless energy separately to corresponding wireless energy receiving devices to which the multiple emitter nodes are distributed. The methods and devices can implement balanced states of charge for wireless energy receiving devices in a wireless energy transmission process, and make it convenient for a user to use multiple wireless energy receiving devices.

20 Claims, 6 Drawing Sheets

(51) Int. Cl.
*H02J 50/20* (2016.01)
*H02J 50/40* (2016.01)
*H02J 50/80* (2016.01)

(56) References Cited

U.S. PATENT DOCUMENTS

| | | |
|---|---|---|
| 2007/0021140 A1 | 1/2007 | Keyes, IV et al. |
| 2014/0035379 A1* | 2/2014 | Stevens .............. H02J 7/0013 |
| | | 307/104 |
| 2014/0217967 A1* | 8/2014 | Zeine .............. H02J 7/025 |
| | | 320/108 |

FOREIGN PATENT DOCUMENTS

| | | |
|---|---|---|
| CN | 103944282 A | 7/2014 |
| CN | 103972993 A | 8/2014 |
| WO | 2013119395 A1 | 8/2013 |
| WO | 2015161725 A1 | 10/2015 |

* cited by examiner

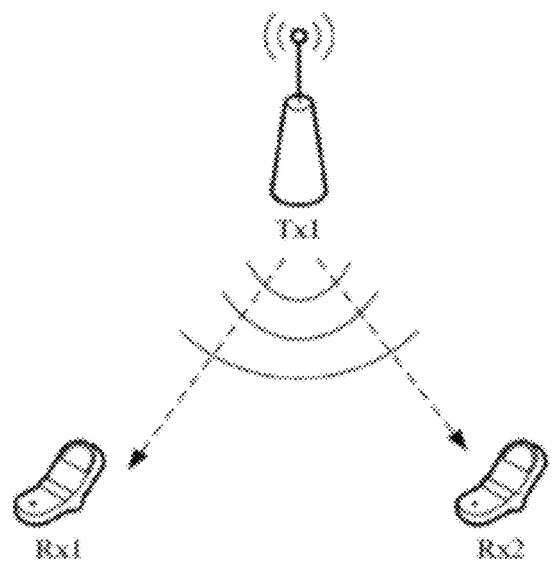

FIG. 2

Control, on the basis of a distribution plan of distributing respectively multiple emitter nodes of a wireless energy sending device to multiple wireless energy receiving devices, multiple emitter nodes to perform wireless energy transmission respectively on corresponding wireless energy receiving devices to which the multiple emitter nodes are distributed — S150

FIG. 3

WIRELESS ENERGY TRANSMISSION METHODS AND WIRELESS ENERGY SENDING DEVICES

RELATED APPLICATION

The present application is a U.S. National Stage filing under 35 U.S.C. § 371 of international patent cooperation treaty (PCT) application No. PCT/CN2015/074071, filed Mar. 12, 2015, and entitled "WIRELESS ENERGY TRANSMISSION METHODS AND WIRELESS ENERGY SENDING DEVICES", which claims the benefit of priority to Chinese Patent Application No. 201410165729.4, filed on Apr. 23, 2014, which applications are hereby incorporated into the present application by reference herein in their respective entireties.

TECHNICAL FIELD

The present application relates to the field of wireless energy transmission, and in particular, to wireless energy transmission methods and wireless energy sending devices.

BACKGROUND

In wireless charging/power supply technologies, an energy sending device and an energy receiving device may perform energy transmission in a wireless manner. An existing wireless charging/power supply technology comprises an inductive coupling technology, a magnetic resonance technology, and a microwave energy transmission technology, and the like. The inductive coupling technology and the magnetic resonance technology are applicable to a short distance (centimeter level) wireless charging/power supply application scenario, whereas the microwave energy transmission technology may implement wireless energy transmission between an energy sending device and an energy receiving device in a long distance (the maximum distance is about 10 meters) application scenario.

FIG. 1 shows a working principle of a microwave energy transmission technology. In a wireless energy transmission system shown in FIG. 1, a wireless energy sending device 330a comprises a power source 300, a communications module 320, control logic 310, and a microwave array 101a, and a wireless energy receiving device 330b comprises a rectifier 340, control logic 350, a communications module 360, and a battery 370. The wireless energy sending device 330a transmits energy 301 to the wireless energy receiving device 330b in a wireless microwave manner. The microwave array 101a in the wireless energy sending device 330a comprises multiple phase adjustable emitter nodes, for example, up to 20000 emitter nodes, which are configured to send the energy 301, and the rectifier 340 in the wireless energy receiving device 330b receives the energy 301, so as to supply power to the battery 370 in the wireless energy receiving device 330b. At the beginning as a wireless energy transmission relationship starts to be established between the wireless energy sending device 330a and the wireless energy receiving device 330b, the microwave array 101a in the wireless energy sending device 330a adjusts phases of the emitter nodes one by one, so that each emitter node is adjusted to an optimal phase of performing wireless energy transmission to achieve an optimal wireless energy transmission effect. The foregoing process is referred to as a "phase calibration stage". In the phase calibration stage, the communications apparatus 360 in the wireless energy receiving device 330b continuously sends a feedback signal to the communications apparatus 320 of the wireless energy sending device 330a by using a wireless data communication channel, so as to report, to the wireless energy sending device 330a, wireless energy transmission intensity (or wireless energy transmission power) received by the rectifier 340. The control logic 310 in the wireless energy sending device 330a adjusts the phases of the emitter nodes in the microwave array 101a one by one on the basis of the feedback signal, until the wireless energy transmission intensity reported by the communications apparatus 360 in the wireless energy receiving device 330b becomes maximal, and the phase calibration stage ends.

As shown in FIG. 2, when multiple wireless energy receiving devices Rx exist in a wireless energy transmission range of one wireless energy sending device Tx; for example, multiple terminal devices in a user's room need to be charged. The multiple wireless energy receiving devices Rx perform wireless energy transmission with the wireless energy sending device Tx in a sharing manner. In such a process, the wireless energy sending device Tx may perform energy transmission on the wireless energy receiving devices Rx in turn within a same or close transmission time. Every time when a wireless energy receiving device Rx that receives energy is switched, the wireless energy sending device Tx needs to perform phase calibration on all emitter nodes to achieve an optimal energy transmission effect.

However, in many scenarios, a user intends to keep relatively balanced states of charge for multiple charged devices, the foregoing sharing manner cannot meet the foregoing needs of the user.

SUMMARY

An example, non-limiting objective of the present application is to provide a wireless energy transmission technology.

According to an example aspect of the present application, a wireless energy transmission method is provided, where the method comprises:

controlling, on the basis of a distribution plan of distributing separately multiple emitter nodes of a wireless energy sending device to multiple wireless energy receiving devices, the multiple emitter nodes to perform wireless energy transmission separately on corresponding wireless energy receiving devices to which the multiple emitter nodes are distributed.

According to another example aspect of the present application, a wireless energy sending device is further provided, where the device comprises:

a wireless energy transmission module, configured to perform wireless energy transmission on a wireless energy receiving device, the wireless energy transmission module comprises multiple emitter nodes; and a control module, configured to control, on the basis of a distribution plan of distributing separately the multiple emitter nodes of the wireless energy transmission module to multiple wireless energy receiving devices, the multiple emitter nodes to perform wireless energy transmission separately on corresponding wireless energy receiving devices to which the multiple emitter nodes are distributed.

The methods and the devices of the present application can implement balanced states of charge for wireless energy receiving devices in a wireless energy transmission process, and make it convenient for a user to use multiple wireless energy receiving devices.

BRIEF DESCRIPTION OF THE DRAWINGS

The disclosure will become more fully understood from the detailed description given herein below for illustration only, and thus are not limitative of the disclosure, and wherein:

FIG. 2 is an example schematic diagram that one wireless energy sending device performs wireless energy transmission on multiple wireless energy receiving devices in the prior art;

FIG. 3 is an example flowchart of steps of a wireless energy transmission method in an embodiment of the present application;

DETAILED DESCRIPTION

Figure 1:
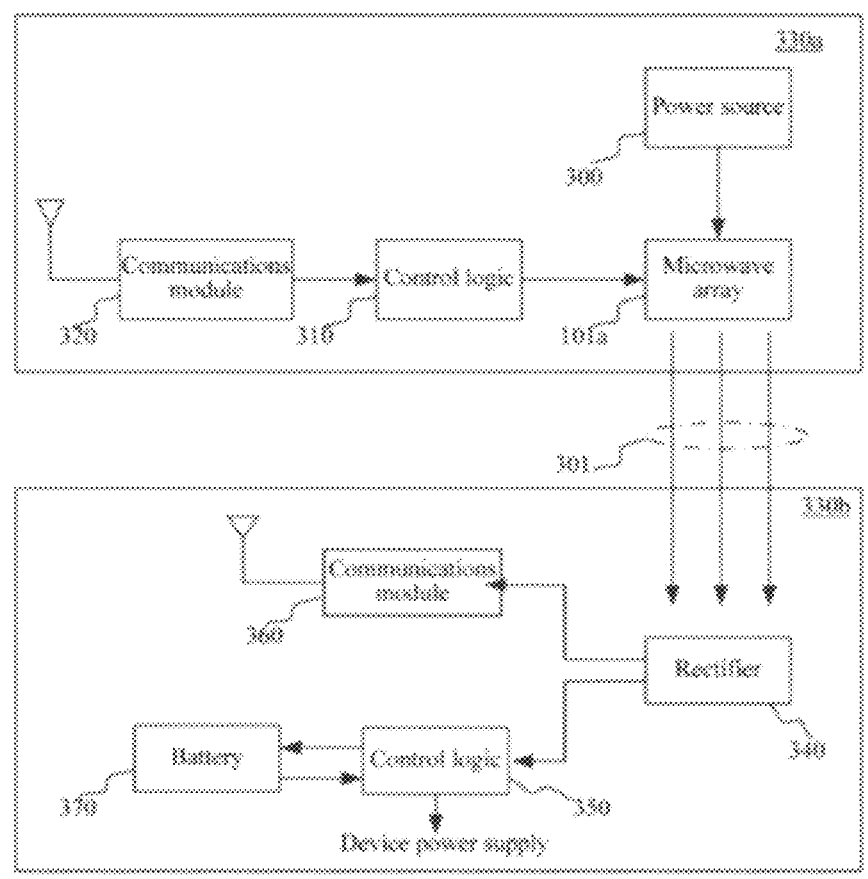
FIG. 1 is an example diagram of a working principle of a microwave energy transmission technology in the prior art.

Various embodiments of the present application are further described in detail below with reference to the accompanying drawings (same reference numerals in several accompanying drawings represent same elements) and embodiments. The following embodiments are for describing the present application, but are not intended to limit the scope of the present application.

A person skilled in the art may understand that the terms such as "first" and "second" in the present application are merely for differentiating different steps, devices, modules, or the like, and neither represent any specific technical meanings nor represent a certain logic sequence among them.

In the embodiments of the present application, multiple wireless energy receiving devices may exist in a wireless energy transmission range of a wireless energy sending device, and a wireless energy transmission relationship occurs between the multiple wireless energy receiving devices and the wireless energy sending device in a sharing manner. To keep relatively balanced states of charge for the multiple wireless energy receiving devices, reference may be made to remaining energy levels of the wireless energy receiving devices, and a specific strategy is used to dynamically distribute multiple emitter nodes in a microwave array of the wireless energy sending device to the multiple wireless energy receiving devices, so that an emitter node that is distributed to a wireless energy receiving device performs energy transmission on the wireless energy receiving device, so as to ensure balanced charging of the devices.

As shown in FIG. 3, a wireless energy transmission method is provided according to an embodiment of the present application. The method may be implemented by a wireless energy sending device in a wireless energy transmission system, so as to perform wireless energy transmission on multiple wireless energy receiving devices in the system. The method comprises:

S150: Control, on the basis of a distribution plan of distributing separately multiple emitter nodes of the wireless energy sending device to the multiple wireless energy receiving devices, the multiple emitter nodes to perform wireless energy transmission separately on corresponding wireless energy receiving devices to which the multiple emitter nodes are distributed.

Next, the functions of the steps in a wireless energy transmission method in this embodiment are described in detail with reference to FIG. 3 and FIG. 4.

Figure 4:
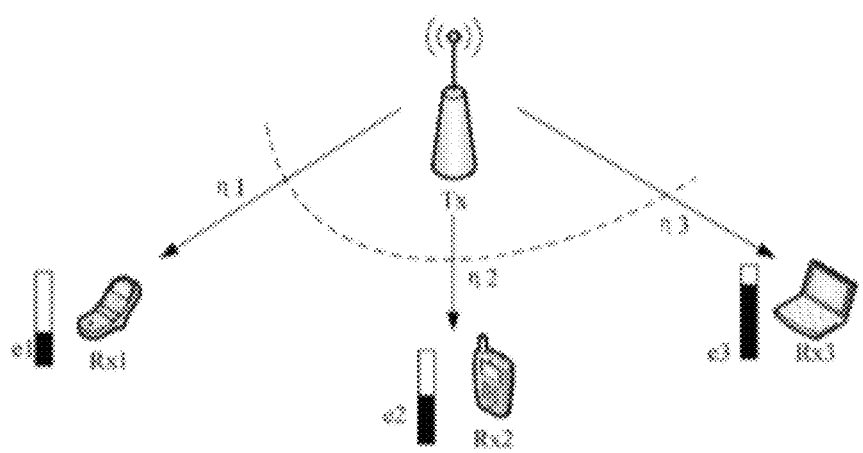
FIG. 4 is an example diagram of an example of a wireless energy transmission system to which a wireless energy transmission method in an embodiment of the present application is applicable.

FIG. 4 shows an example of a wireless energy transmission system to which the method in this embodiment is applicable. The system comprises one wireless energy sending device Tx and multiple wireless energy receiving devices Rx. FIG. 4 exemplarily shows 3 wireless energy receiving devices Rx1, Rx2, and Rx3. In a practical application scenario, the number of the wireless energy receiving devices may also be two or greater than 3. In this embodiment, the wireless energy sending device Tx may control, on the basis of a distribution plan of emitter nodes of the wireless energy sending device Tx, the multiple emitter nodes of the wireless energy sending device Tx performs wireless energy transmission separately on the multiple wireless energy receiving devices Rx, that is, the wireless energy sending device Tx distributes, according to the distribution plan, some emitter nodes to each wireless energy receiving device Rx on which wireless energy transmission needs to be performed, and these emitter nodes perform wireless energy transmission on a corresponding wireless energy receiving device. Specifically, in a "phase calibration stage", phases of multiple emitter nodes that are distributed to a wireless energy receiving device are adjusted one by one, so that each emitter node is adjusted to an optimal phase of performing wireless energy transmission on the wireless energy receiving device, so as to achieve an optimal wireless energy transmission effect. In a process where the wireless energy sending device Tx performs wireless energy transmission on the multiple wireless energy receiving devices Rx, the distribution of the emitter nodes may be dynamically adjusted. When a distribution result of an emitter node is changed and the emitter node is distributed to another wireless energy receiving device, the phase of the emitter node is adjusted to achieve an optimal energy transmission effect corresponding to the another wireless energy receiving device.

To achieve relatively balanced states of charge for the multiple wireless energy receiving devices Rx, in S150 in the method in this embodiment, the wireless energy sending device Tx controls, on the basis of a distribution plan of distributing separately the multiple emitter nodes to the multiple wireless energy receiving devices Rx, the multiple emitter nodes to perform wireless energy transmission separately on a corresponding wireless energy receiving device to which the emitter nodes are distributed. In an example embodiment, the distribution plan may be preset and stored in an external storage device; in this case, the method in this embodiment may further comprise S110: The wireless energy sending device acquires the distribution plan from outside.

In another example embodiment, the method in this embodiment may further comprise S120: The wireless energy sending device distributes separately the multiple emitter nodes of the wireless energy sending device to the multiple wireless energy receiving devices, to obtain the distribution plan. In this process, to achieve relatively balanced states of charge for the multiple wireless energy receiving devices, various factors such as remaining energy levels of the multiple wireless energy receiving devices and respective wireless energy transmission efficiency between the wireless energy sending device and the multiple wireless energy receiving devices may be taken into consideration in the process of obtaining the distribution plan. Multiple factors to consider and specific manners to obtain the distribution plan are described below in detail with reference to FIG. 4.

In a first example embodiment, the wireless energy sending device Tx may distribute separately, according to remaining energy levels of the multiple wireless energy receiving devices Rx, multiple emitter nodes of the wireless energy sending device Tx to the multiple wireless energy receiving devices Rx, so as to obtain the distribution plan. In this case, specifically, a percentage e of current charge relative to full charge of a wireless energy receiving device Rx is used to reflect a remaining energy level of wireless energy receiving device Rx. As shown in FIG. 4, a remaining energy level e1 of Rx1=20%, a remaining energy level e2 of Rx2=50%, and a remaining energy level e3 of Rx3=80%. In this example embodiment, to achieve relatively balanced states of charge for the multiple wireless energy receiving devices, a general distribution principle is that, when a remaining energy level of a wireless energy receiving device is lower, more emitter nodes are distributed to perform wireless energy transmission on the wireless energy receiving device. Assuming that M emitter nodes in total exist in a microwave array of the wireless energy sending device Tx, and the numbers of emitter nodes distributed by the wireless energy sending device Tx to the wireless energy receiving devices Rx1, Rx2, and Rx3 are M1, M2, and M3, respectively, Formula (1) to Formula (3) in the following may be met:

$$M1 = \frac{1-e1}{(1-e1)+(1-e2)+(1-e3)} \times M \quad (1)$$

$$M2 = \frac{1-e2}{(1-e1)+(1-e2)+(1-e3)} \times M \quad (2)$$

$$M3 = \frac{1-e3}{(1-e1)+(1-e2)+(1-e3)} \times M \quad (3)$$

A person skilled in the art may understand that, according to the foregoing distribution rule, because only a percentage e of current charge relative to full charge of each wireless energy receiving device is considered, as wireless energy transmission progresses, a changing speed of a percentage e of current charge relative to full charge of each wireless energy receiving device may be different, and a distribution result of emitter nodes that is obtained through calculation by using Formula (1) to Formula (3) changes accordingly. In a case where battery capacities of the wireless energy receiving devices are close, the foregoing distribution result does not change much. However, when battery capacities of the wireless energy receiving devices are different to a relatively large extent, the foregoing distribution result changes significantly as wireless energy transmission progresses, that is, the number of emitter nodes that are distributed to a wireless energy receiving device in the multiple wireless energy receiving devices Rx changes dynamically in real time. In such a case, distribution results of some emitter nodes are changed and the emitter nodes are distributed to another wireless energy receiving device, and the phases of the emitter nodes are also adjusted to achieve an optimal energy transmission effect corresponding to another wireless energy receiving device. In this example embodiment, a current percentage e of current charge relative to full charge of each wireless energy receiving device Rx may be periodically detected at a predetermined time interval, and a detection result is used to calculate the numbers M1, M2, and M3 of emitter nodes that are distributed to the wireless energy receiving devices Rx1, Rx2, and Rx3, so as to adjust the distribution plan dynamically. In this way, multiple emitter nodes may further be controlled, on the basis of an adjusted distribution plan, to perform wireless energy transmission separately on corresponding wireless energy receiving devices to which the multiple emitter nodes are redistributed.

In a second example embodiment, the wireless energy sending device Tx may distribute separately, according to the remaining energy levels of the multiple wireless energy receiving devices Rx, the multiple emitter nodes of the wireless energy sending device Tx to the multiple wireless energy receiving devices Rx, to obtain the distribution plan. In this case, specifically, current charge of a wireless energy receiving device Rx is used to reflect the remaining energy level of wireless energy receiving device Rx. It is set that the full charge of the wireless energy receiving device Rx1 is E1, the full charge of the wireless energy receiving device Rx2 is E2, and the full charge of the wireless energy receiving device Rx3 is E3. As shown in FIG. 4, the remaining energy level of Rx1 is E1*e1, the remaining energy level of Rx2 is E2*e2, and the remaining energy level of Rx3 is E3*e3. In this example embodiment, to achieve relatively balanced states of charge for the multiple wireless energy receiving devices, a general distribution principle is that, when a remaining energy level of a wireless energy receiving device is lower, more emitter nodes are distributed to perform wireless energy transmission on the wireless energy receiving device. The numbers of emitter nodes that the wireless energy sending device Tx distributes to each wireless energy receiving devices Rx1, Rx2, and Rx3 may meet Formula (4) to Formula (6) in the following:

$$M1 = \frac{E1 \times (1-e1)}{E1 \times (1-e1) + E2 \times (1-e2) + E3 \times (1-e3)} \times M \quad (4)$$

$$M2 = \frac{E2 \times (1-e2)}{E1 \times (1-e1) + E2 \times (1-e2) + E3 \times (1-e3)} \times M \quad (5)$$

$$M3 = \frac{E3 \times (1-e3)}{E1 \times (1-e1) + E2 \times (1-e2) + E3 \times (1-e3)} \times M \quad (6)$$

A person skilled in the art may understand that, according to the foregoing distribution rule, because current charge of each wireless energy receiving device is regarded as a remaining energy level, a distribution result of emitter nodes for each wireless energy receiving device is separately proportional to energy required to fully charge each wireless energy receiving device; therefore, as wireless energy transmission progresses, in a case of assuming that respective wireless energy transmission efficiency between the wireless energy sending device and the multiple wireless energy receiving devices is same or close, the numbers of emitter nodes M1, M2, and M3 obtained through calculation by using Formula (4) to Formula (6) do not change significantly as wireless energy transmission progresses, so that compared with the first example embodiment, an extent to which the distribution of emitter nodes is changed dynamically in real time is significantly reduced. However, at the same time, in a case where respective wireless energy transmission efficiency between the wireless energy sending device and the multiple wireless energy receiving devices is different to a relatively large extent, the numbers of emitter nodes M1, M2, and M3 may still be dynamically changed significantly as wireless energy transmission progresses.

In a third example embodiment, the wireless energy sending device Tx may distribute separately, according to the remaining energy levels of the multiple wireless energy receiving devices Rx and respective wireless energy transmission efficiency between the wireless energy sending device Tx and the multiple wireless energy receiving devices Rx, multiple emitter nodes of the wireless energy sending device Tx to the multiple wireless energy receiving devices Rx, to obtain the distribution plan. In this case, specifically, a percentage e of current charge relative to full charge of a wireless energy receiving device Rx is used to reflect a remaining energy level of the wireless energy receiving device Rx, and η is used to represent wireless energy transmission efficiency between the wireless energy sending device Tx and a wireless energy receiving device. In this example embodiment, the wireless energy transmission efficiency η between a wireless energy sending device and a wireless energy receiving device is defined by Formula (7) as follows:

$$\eta = \frac{e_{received}}{e_{sent}} \quad (7)$$

where $e_{received}$ is energy received by a wireless energy receiving device, and $e_{sent}$ is energy sent by the wireless energy sending device. It can be seen that the wireless energy transmission efficiency η is a ratio of the energy received by the wireless energy receiving device to the energy sent by the wireless energy sending device. In an ideal lossless wireless energy transmission state, the wireless energy transmission efficiency η equals 1, whereas in a normal transmission state, the wireless energy transmission efficiency η is a value less than 1. When the value is closer to 1, it indicates a lower loss in a wireless energy transmission process, and the wireless energy transmission efficiency is higher.

As shown in FIG. 4, the remaining energy level e1 of Rx1=20%, the remaining energy level e2 of Rx2=50%, and the remaining energy level e3 of Rx3=80%. The wireless energy transmission efficiency between the wireless energy sending device Tx and the wireless energy receiving device Rx1 is η1, the wireless energy transmission efficiency between the wireless energy sending device Tx and the wireless energy receiving device Rx2 is η2, and the wireless energy transmission efficiency between the wireless energy sending device Tx and the wireless energy receiving device Rx3 is η3. In this example embodiment, to achieve relatively balanced states of charge for the multiple wireless energy receiving devices, a general distribution principle is that, when a remaining energy level of a wireless energy receiving device is lower, more emitter nodes are distributed to perform wireless energy transmission on the wireless energy receiving device, and meanwhile, when wireless energy transmission efficiency between the wireless energy sending device and a wireless energy receiving device is lower, more emitter nodes are distributed to perform wireless energy transmission on the wireless energy receiving device. After the foregoing factors are considered in combination, the numbers of emitter nodes that the wireless energy sending device Tx distributes to the wireless energy receiving devices Rx1, Rx2, and Rx3 may meet Formula (8) to Formula (10) in the following:

$$M1 = \frac{1-e1}{(1-e1)+(1-e2)+(1-e3)} \times \frac{1/\eta 1}{1/\eta 1 + 1/\eta 2 + 1/\eta 3} \times M \quad (8)$$

$$M2 = \frac{1-e1}{(1-e1)+(1-e2)+(1-e3)} \times \frac{1/\eta 1}{1/\eta 1 + 1/\eta 2 + 1/\eta 3} \times M \quad (9)$$

$$M3 = \frac{1-e1}{(1-e1)+(1-e2)+(1-e3)} \times \frac{1/\eta 1}{1/\eta 1 + 1/\eta 2 + 1/\eta 3} \times M \quad (10)$$

A person skilled in the art may understand that, compared with the first example embodiment, this example embodiment considers differences in respective wireless energy transmission efficiency between the wireless energy sending device and the multiple wireless energy receiving devices, so as to reduce to a certain extent dynamic changes that occur in the numbers of emitter nodes M1, M2, and M3 as wireless energy transmission progresses.

In a fourth example embodiment, the wireless energy sending device Tx may distribute separately, according to the remaining energy levels of the multiple wireless energy receiving devices Rx and respective wireless energy transmission efficiency between the wireless energy sending device Tx and the multiple wireless energy receiving devices Rx, multiple emitter nodes of the wireless energy sending device Tx to the multiple wireless energy receiving devices Rx, to obtain the distribution plan. In this case, specifically, current charge of a wireless energy receiving device Rx is used to reflect a remaining energy level of wireless energy receiving device Rx, and η is used to represent wireless energy transmission efficiency between the wireless energy sending device Tx and the wireless energy receiving device Rx. As shown in FIG. 4, the remaining energy level of Rx1 is E1*e1, the remaining energy level of Rx2 is E2*e2, and the remaining energy level of Rx3 is E3*e3. The wireless energy transmission efficiency between the wireless energy sending device Tx and the wireless energy receiving device Rx1 is η1, the wireless energy transmission efficiency between the wireless energy sending device Tx and the wireless energy receiving device Rx2 is η2, and the wireless energy transmission efficiency between the wireless energy sending device Tx and the wireless energy receiving device Rx3 is η3. In this example embodiment, to achieve relatively balanced states of charge for the multiple wireless energy receiving devices, a general distribution principle is that, when a remaining energy level of a wireless energy receiving device is lower, more emitter nodes are distributed to perform wireless energy transmission on the wireless energy receiving device, and meanwhile when wireless energy transmission efficiency between the wireless energy sending device and a wireless energy receiving device is lower, more emitter nodes are distributed to perform wireless energy transmission on the wireless energy receiving device. After the foregoing factors are considered in combination, the numbers of emitter nodes that the wireless energy sending device Tx distributes to the wireless energy receiving devices Rx1, Rx2, and Rx3 may meet Formula (11) Formula (13) in the following:

$$M1 = \frac{E1 \times (1 - e1)}{E1 \times (1 - e1) + E2 \times (1 - e2) + E3 \times (1 - e3)} \times \frac{1/\eta 1}{1/\eta 1 + 1/\eta 2 + 1/\eta 3} \times M \quad (11)$$

$$M2 = \frac{E2 \times (1 - e2)}{E1 \times (1 - e1) + E2 \times (1 - e2) + E3 \times (1 - e3)} \times \frac{1/\eta 2}{1/\eta 1 + 1/\eta 2 + 1/\eta 3} \times M \quad (12)$$

$$M3 = \frac{E3 \times (1 - e3)}{E1 \times (1 - e1) + E2 \times (1 - e2) + E3 \times (1 - e3)} \times \frac{1/\eta 3}{1/\eta 1 + 1/\eta 2 + 1/\eta 3} \times M \quad (13)$$

A person skilled in the art may understand that, compared with the second example embodiment, this example embodiment further considers differences in respective wireless energy transmission efficiency between the wireless energy sending device and the multiple wireless energy receiving devices, so as to further reduce dynamic changes that occur in the numbers of emitter nodes M1, M2, and M3 as wireless energy transmission progresses.

As can be seen from the four example embodiments of S120, a distribution plan of emitter nodes of a wireless energy sending device for each wireless energy receiving device changes dynamically as wireless energy transmission progresses, that is, some emitter nodes are switched from performing wireless energy transmission on a wireless energy receiving device to perform wireless energy transmission on another wireless energy receiving device. Therefore, in an example embodiment, the method in this embodiment further comprises Step S160: Record phase information of at least one emitter node that performs wireless energy transmission on at least one wireless energy receiving device among the multiple wireless energy receiving devices. In this way, phase information of at least one emitter node that is performing wireless energy transmission on a wireless energy receiving device is recorded. When another emitter node is switched to perform wireless energy transmission on the wireless energy receiving device, phase adjustment may be directly performed according to the recorded phase information, thereby shortening the time for phase calibration stage.

As can be seen, according to the foregoing method in this embodiment, in a process in which a wireless energy sending device transmits energy to multiple wireless energy receiving devices in a system, it may be implemented that states of charge of the wireless energy receiving devices keep becoming more balanced, and charging processes for all wireless energy receiving devices may be completed within relatively close time periods. Even though energy transmission must be interrupted by other causes in the entire process, a user may also obtain a charging result of balanced states of charge for the wireless energy receiving devices, and it becomes convenient for the user to use all wireless energy receiving devices.

A person skilled in the art may understand that in the foregoing method in the example embodiment of the present application, the sequence numbers of the steps do not mean an execution sequence, and the execution sequence of the steps should be determined by the functions and internal logic of the steps rather than to cause any limitations on the implementation process of an example embodiment of the present application.

In addition, an embodiment of the present application further provides a computer readable medium, which comprises a computer readable instruction that performs the following operation when being executed: executing the steps and operations in the method in the embodiment shown in FIG. 3 above.

Figure 5:
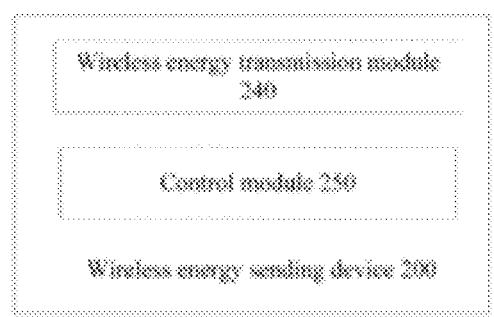
FIG. 5 is an example schematic structural diagram of a wireless energy sending device in an embodiment of the present application.

As shown in FIG. 5, a wireless energy sending device 200 is provided according to another embodiment of the present application. The device 200 may perform wireless energy transmission on multiple wireless energy receiving devices in a wireless energy transmission system, and for example, is implemented as the wireless energy sending device Tx in FIG. 4. The device 200 comprises:

a wireless energy transmission module 240, configured to perform wireless energy transmission on a wireless energy receiving device, where the wireless energy transmission module comprises multiple emitter nodes; and a control module 250, configured to control, on the basis of a distribution plan of distributing separately multiple emitter nodes of the wireless energy transmission module to the multiple wireless energy receiving devices, the multiple emitter nodes to perform wireless energy transmission separately on corresponding wireless energy receiving devices to which the multiple emitter nodes are distributed.

Next, the functions of the modules in the wireless energy sending device in this embodiment are described in detail with reference to FIG. 5 to FIG. 8.

In this embodiment, as shown in FIG. 4, the control module 250 of the wireless energy sending device Tx may control, on the basis of a distribution plan of emitter nodes for the wireless energy transmission module 240, the multiple emitter nodes to perform wireless energy transmission separately on the multiple wireless energy receiving devices Rx, that is, the control module 250 distributes, according to the distribution plan, some emitter nodes of the wireless energy transmission module 240 to each wireless energy receiving device Rx on which wireless energy transmission needs to be performed. These emitter nodes perform wireless energy transmission on a corresponding wireless energy receiving device.

Figure 6:
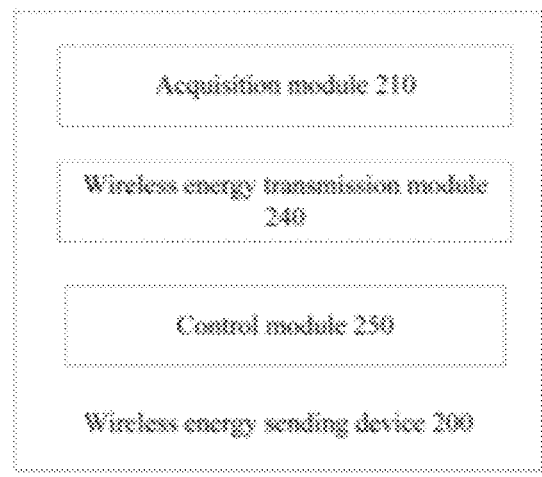
FIG. 6 is another example schematic structural diagram of a wireless energy sending device in an embodiment of the present application.

To achieve relatively balanced states of charge for the multiple wireless energy receiving devices Rx, in an example embodiment of the device 200 in this embodiment, as shown in FIG. 6, an acquisition module 210 may be comprised, and is configured to acquire the distribution plan from outside.

Figure 7:
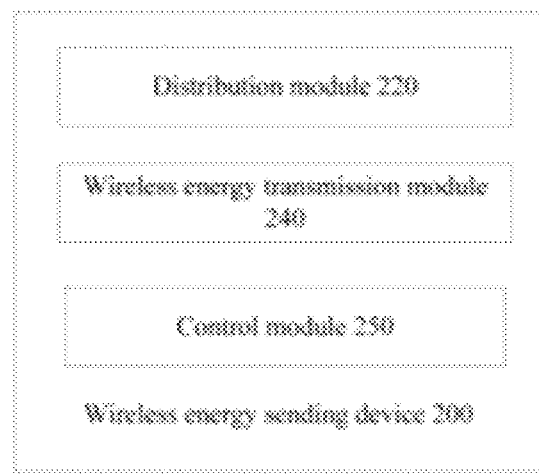
FIG. 7 is another example schematic structural diagram of a wireless energy sending device in an embodiment of the present application.
Figure 8:
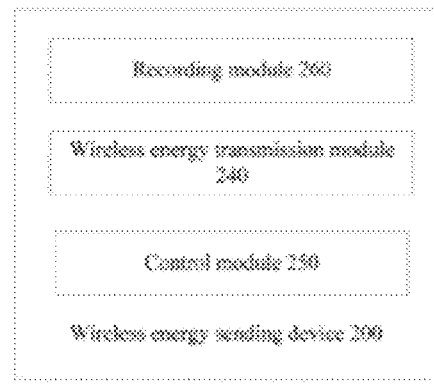
FIG. 8 is another example schematic structural diagram of a wireless energy sending device in an embodiment of the present application.

In another example embodiment, as shown in FIG. 7, the device 200 in this embodiment may further comprise a distribution module 220, configured to distribute separately the multiple emitter nodes of the wireless energy transmission module 240 to the multiple wireless energy receiving devices, to obtain the distribution plan. In this process, to achieve relatively balanced states of charge for the multiple wireless energy receiving devices, various factors such as remaining energy levels of the multiple wireless energy receiving devices and respective wireless energy transmission efficiency between the wireless energy sending device and the multiple wireless energy receiving devices may be taken into consideration in the process of obtaining the distribution plan.

In the first example embodiment, the distribution module 220 may distribute separately, according to the remaining energy levels of the multiple wireless energy receiving devices Rx, multiple emitter nodes of the wireless energy transmission module 240 to the multiple wireless energy receiving devices Rx, to obtain the distribution plan. In this case, specifically, a percentage e of current charge relative to full charge of a wireless energy receiving device Rx is used to reflect a remaining energy level of the wireless energy receiving device Rx.

In a second example embodiment, the distribution module 220 may distribute separately, according to the remaining energy levels of the multiple wireless energy receiving devices Rx, the multiple emitter nodes of the wireless energy transmission module 240 to the multiple wireless energy receiving devices Rx, to obtain the distribution plan. In this case, specifically, current charge of a wireless energy receiving device Rx is used to reflect a remaining energy level of the wireless energy receiving device Rx.

In a third example embodiment, the distribution module 220 may distribute separately, according to the remaining energy levels of the multiple wireless energy receiving devices Rx and respective wireless energy transmission efficiency between the wireless energy sending device Tx and the multiple wireless energy receiving devices Rx, the multiple emitter nodes of the wireless energy transmission module 240 to the multiple wireless energy receiving devices Rx, to obtain the distribution plan. In this case, specifically, a percentage e of current charge relative to full charge of a wireless energy receiving device Rx is used to reflect a remaining energy level of the wireless energy receiving device Rx, and η is used to represent wireless energy transmission efficiency between the wireless energy sending device Tx and a wireless energy receiving device.

In a fourth example embodiment, the distribution module 220 may distribute separately, according to the remaining energy levels of the multiple wireless energy receiving devices Rx and respective wireless energy transmission efficiency between the wireless energy sending device Tx and the multiple wireless energy receiving devices Rx, the multiple emitter nodes of the wireless energy transmission module 240 to the multiple wireless energy receiving devices Rx, to obtain the distribution plan. In this case, specifically, current charge of a wireless energy receiving device Rx is used to reflect a remaining energy level of wireless energy receiving device Rx, and η is used to represent wireless energy transmission efficiency between the wireless energy sending device Tx and the wireless energy receiving device Rx.

As can be seen from the four example embodiments of the distribution module 220 above, a distribution plan of emitter nodes of the wireless energy transmission module 240 for each wireless energy receiving device is changed and adjusted dynamically as wireless energy transmission progresses. Therefore, the control module 250 may be further configured to control, on the basis of an adjusted distribution plan, multiple emitter nodes to perform wireless energy transmission separately on corresponding wireless energy receiving devices to which the multiple emitter nodes are redistributed.

In an example embodiment, this embodiment device 200 may further comprise a recording module 260, configured to record phase information of at least one emitter node that performs wireless energy transmission on at least one wireless energy receiving device among the multiple wireless energy receiving devices. In this way, phase information of at least one emitter node that is performing wireless energy transmission on a wireless energy receiving device is recorded. When another emitter node is switched to perform wireless energy transmission on the wireless energy receiving device, phase adjustment may be directly performed according to the recorded phase information, thereby shortening the time for phase calibration stage.

As can be seen, for the foregoing wireless energy sending device according to this embodiment, in a process of transmitting energy to the multiple wireless energy receiving devices, the device may achieve that states of charge for the wireless energy receiving devices keep becoming more balanced, and may complete a charging process for all wireless energy receiving devices within relatively close time periods. Even though energy transmission must be interrupted by other causes in the entire process, a user may also obtain a charging result of balanced states of charge for the wireless energy receiving devices, and it becomes convenient for the user to use all the wireless energy receiving devices.

Figure 9:
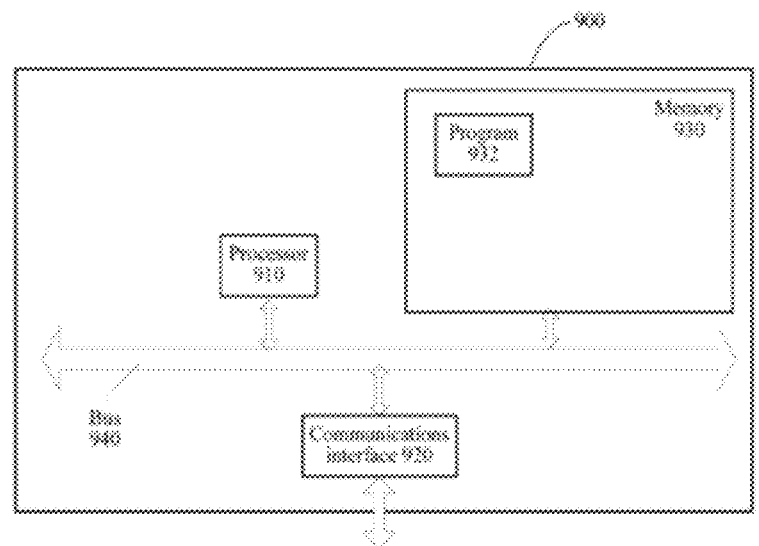
FIG. 9 is an example schematic diagram of a hardware structure of a wireless energy sending device in an embodiment of the present application.
Figure 10:
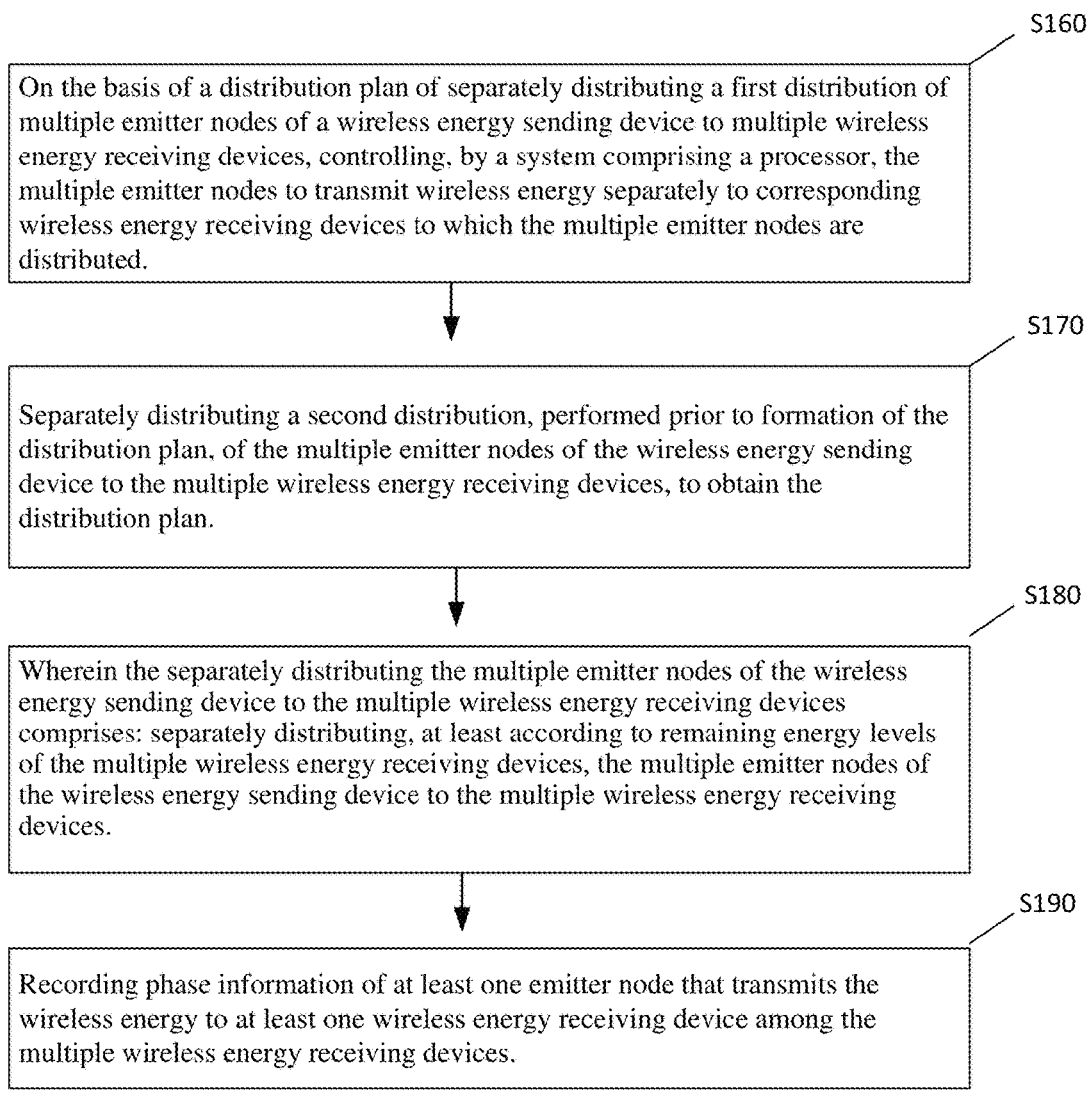

FIG. 9 is a schematic structural diagram of a wireless energy sending device 900 provided in an embodiment of the present application. Specific embodiments of the present application do not cause any limitation on specific implementation of the wireless energy sending device 900. As shown in FIG. 9, the wireless energy sending device 900 may comprise:

a processor 910, a communications interface 920, a memory 930, and a communications bus 940. Where: the processor 910, the communications interface 920, and the memory 930 accomplish communication with each other by using the communications bus 940.

The communications interface 920 is configured to communicate with a network element such as a client.

The processor 910 is configured to execute a program 932, and may specifically implement functions related to the wireless energy sending device in the device embodiments shown in FIG. 5 to FIG. 8 above.

Specifically, the program 932 may comprise program code, and the program code comprises a computer operation instruction.

The processor 910 may be a central processing unit (CPU), or an application specific integrated circuit (ASIC), or may be configured as one or more integrated circuits that implement the embodiment of the present application.

The memory 930 is configured to store the program 932. The memory 930 may comprise a high-speed RAM memory, or may further comprise a non-volatile memory, for example, at least one magnetic disk memory. The program 932 may specifically implement the following operation:

controlling, on the basis of a distribution plan of distributing separately multiple emitter nodes of the wireless energy sending device to multiple wireless energy receiving devices, the multiple emitter nodes to perform wireless energy transmission separately on corresponding wireless energy receiving devices to which the multiple emitter nodes are distributed.

Reference may be made to a correspondingly step in the embodiment shown in FIG. 3 for specific implementation of each operation in the program 932, which is no longer elaborated here. A person skilled in the art may clearly understand that for convenience and simplicity of description, for the specific working procedure of the device and module described above, reference may be made to the corresponding description in the device embodiments, which are no longer elaborated herein.

Although the subject here is provided in the general context that is executed in combination with the execution of an operating system and application software, a person skilled in the art may realize that other implementations may be executed in combination with another type of program module. Generally, a program module comprises a routine, a program, a component, a data structure, and another type of structure that executes a specific task or implements a specific abstract data type. A person skilled in the art may understand that the subject herein may be implemented by using another computer system configuration, which comprises a handheld device, a multiprocessor system, a microprocessor-based or programmable consumer electronic product, a mini computer, a mainframe computer, and the like, or may also be used in a distributed computing environment in which a task is executed by a remote processing device connected to a communications network. In the distributed computing environment, the program module may be located in both a local memory storage device and a remote memory storage device.

Persons of ordinary skill in the art may further appreciate that, in combination with the examples described in the embodiments herein, units and method steps can be implemented by electronic hardware or a combination of computer software and electronic hardware. Whether these functions are performed using hardware or software depends on particular applications and design constraints of the technical solutions. A person skilled in the art may use different methods to implement the described functions for each specific application. However, such implementation should not be considered as beyond the scope of the present application.

If implemented in the form of software functional units and sold or used as an independent product, the functions may also be stored in a computer readable storage medium. Based on this, the technical solution of the present application or the part that makes contributions to the prior art or the part of the technical solution can be substantially embodied in the form of a software product. The computer software product may be stored in a storage medium and contain several instructions to cause computer equipment (for example, a personal computer, a server, or network equipment) to perform all or a part of the steps of the method described in the embodiments of the present application. The foregoing computer readable storage medium comprises physical volatile and nonvolatile, removable and removable medium that is implemented by using any manner or technology of storing information such as a computer readable instruction, a data structure, a program module or other data. The computer readable storage medium specifically comprise S, but is not limited to, a USB flash drive, a removable hard disk, a Read-Only Memory (ROM, Read-Only Memory), an erasable programmable ROM (EPROM), an electrically erasable programmable ROM (EEPROM), a flash drive or another solid-state memory technology, a compact disc-ROM (CD-ROM), a digital versatile disc (DVD), a high definition-DVD (HD-DVD), a Blue-Ray or another optical storage device, a magnetic tape, a disk storage or another magnetic storage device, or any other medium that can be used to store needed information and accessible by a computer.

The foregoing example embodiment is only used for describing the present application rather than to limit the present application. A person of ordinary skill in the technical field may further make various changes and modifications without departing from the spirit and scope of the present application; therefore, all equivalent technical solutions also fall within the scope of the present application, and the patent scope of the present application shall be defined by the claims.

What is claimed is:

1. A method, comprising:
separately distributing, by a system comprising a processor at least according to remaining energy levels of multiple wireless energy receiving devices, multiple emitter nodes of a wireless energy sending device to multiple wireless energy receiving devices, to acquire a distribution plan applicable to separate distribution of the multiple emitter nodes of the wireless energy sending device to the multiple wireless energy receiving devices: and
on the basis of the distribution plan controlling, by the system, the multiple emitter nodes to transmit wireless energy separately to corresponding wireless energy receiving devices to which the multiple emitter nodes are distributed.

2. The method of claim 1, further comprising:
acquiring the distribution plan from an external device.

3. The method of claim 1, wherein the separately distributing the multiple emitter nodes of the wireless energy sending device to the multiple wireless energy receiving devices comprises:
separately distributing, further according to respective wireless energy transmission efficiencies between the wireless energy sending device and the multiple wireless energy receiving devices, the multiple emitter nodes of the wireless energy sending device to the multiple wireless energy receiving devices.

4. The method of claim 1, wherein the remaining energy levels are percentages of current charge relative to full charge of the multiple wireless energy receiving devices.

5. The method of claim 4, wherein the percentages of current charge relative to the full charge of the multiple wireless energy receiving devices are periodically detected according to a defined time interval.

6. The method of claim 1, wherein the remaining energy levels are current charges of the multiple wireless energy receiving devices.

7. The method of claim 1, further comprising:
recording phase information of at least one emitter node that transmits the wireless energy to at least one wireless energy receiving device among the multiple wireless energy receiving devices.

8. The method of claim 7, further comprising:
after the at least one emitter node of the multiple emitter nodes has transmitted to the at least one wireless energy receiving device of the multiple wireless energy receiving devices, adjusting, according to the phase information, a phase of the at least one emitter node.

9. The method of claim 1, wherein the corresponding wireless energy receiving devices are first corresponding wireless energy receiving devices, and further comprising:
controlling, on the basis of an adjusted distribution plan, the multiple emitter nodes to transmit the wireless energy separately to second corresponding wireless energy receiving devices to which the multiple emitter nodes are redistributed.

10. The method of claim 1, wherein the distribution plan is preset.

11. A device, comprising:
a processor, coupled to a memory, that executes or facilitates execution of executable modules, comprising:
a wireless energy transmission module configured to transmit wireless energy to a wireless energy receiving device of multiple wireless energy receiving devices, wherein the wireless energy transmission module comprises multiple emitter nodes;

a distribution module configured to separately distribute, at least according to remaining energy levels of the multiple wireless energy receiving devices, the multiple emitter nodes of the wireless energy transmission module to the multiple wireless energy receiving devices, to acquire a distribution plan of separately distributing the multiple emitter nodes of the wireless energy transmission module to the multiple wireless energy receiving devices; and a control module configured to control, on the basis of the distribution plan, the multiple emitter nodes to transmit the wireless energy separately to corresponding wireless energy receiving devices to which the multiple emitter nodes are distributed.

12. The device of claim 11, wherein the executable modules further comprise:

an acquisition module configured to acquire the distribution plan from an external storage device.

13. The device of claim 11, wherein the distribution module is configured to separately distribute, further according to respective wireless energy transmission efficiencies between the wireless energy sending device and the multiple wireless energy receiving devices, the multiple emitter nodes of the wireless energy transmission module to the multiple wireless energy receiving devices.

14. The device of claim 11, wherein the executable modules further comprise:

a recording module configured to record phase information of at least one emitter node that transmits wireless energy to at least one wireless energy receiving device among the multiple wireless energy receiving devices.

15. The device of claim 14, wherein the recording module is further configured to adjust, according to the phase information, a phase of the at least one emitter node of the multiple emitter nodes that has transmitted the wireless energy to the at least one wireless energy receiving device.

16. The device of claim 11, wherein the corresponding wireless energy receiving devices are first corresponding wireless energy receiving devices, and wherein the control module is further configured to control, on the basis of an adjusted distribution plan, the multiple emitter nodes to perform wireless energy transmission separately on second corresponding wireless energy receiving devices to which the multiple emitter nodes are redistributed.

17. A non-transitory computer readable storage device comprising executable instructions that, in response to execution, cause a device comprising a processor to perform operations, comprising:

separately distributing, at least according to remaining energy levels of multiple wireless energy receiving devices, multiple emitter nodes of a wireless energy sending device to the multiple wireless energy receiving devices, to obtain a distribution plan pertaining to separate distribution of the multiple emitter nodes of the wireless energy sending device to the multiple wireless energy receiving devices; and controlling, on the basis of the distribution plan, the multiple emitter nodes to transmit wireless energy separately to corresponding wireless energy receiving devices to which the multiple emitter nodes are distributed.

18. The non-transitory computer readable storage device of claim 17, wherein the operations further comprise measuring phase information of at least one emitter node of the multiple emitter nodes that transmits the wireless energy to at least one wireless energy receiving device of the multiple wireless energy receiving devices, and, based on the phase information, modifying at least one phase of the at least one emitter node.

19. The non-transitory computer readable storage device of claim 17, wherein the remaining energy levels are values representative of respective current charges of the multiple wireless energy receiving devices relative to respective full charges of the multiple wireless energy receiving devices.

20. The non-transitory computer readable storage device of claim 19, wherein the operations further comprise periodically determining the values.

* * * * *